United States Patent
White

[15] 3,664,207
[45] May 23, 1972

[54] DUAL RATCHET CLUTCH DRIVE
[72] Inventor: Frederick M. White, Louisville, Ky.
[73] Assignee: General Electric Company
[22] Filed: Aug. 17, 1970
[21] Appl. No.: 64,331

[52] U.S. Cl............................74/337.5, 74/358, 192/48.92
[51] Int. Cl......................F16h 5/06, F16h 3/10, F16d 41/00
[58] Field of Search..............74/337.5, 368, 625, 331, 358; 192/48.92, 48.9

[56] References Cited

UNITED STATES PATENTS

| | | | |
|---|---|---|---|
| 1,687,721 | 10/1928 | Glosh.....................................74/337.5 |
| 2,280,683 | 4/1942 | Bedford................................74/368 X |
| 2,391,718 | 12/1945 | Lindemann.........................68/12 R X |
| 2,872,828 | 2/1959 | Brogdon................................74/368 |

FOREIGN PATENTS OR APPLICATIONS

| | | | |
|---|---|---|---|
| 695,812 | 10/1930 | France..................................74/337.5 |
| 1,164,290 | 5/1958 | France.....................................74/368 |
| 78,761 | 6/1962 | France.....................................74/368 |
| 763,176 | 9/1953 | Germany................................74/368 |

Primary Examiner—Carlton R. Croyle
Assistant Examiner—Thomas C. Perry
Attorney—Walter E. Rule, Francis H. Boos, Jr., Frank L. Neuhauser, Oscar B. Waddell and Joseph B. Forman

[57] ABSTRACT

A motor-driven cam-operated switch having a rotary cam adapted to selectively open and close at least one switch means in response to rotation of the cam and having a drive motor adapted for connection to a source of electrical energy, is provided with a two-speed drive train adapted to selectively transmit low or high speed rotational motion to the rotary cam. The drive train includes first and second ratchet clutches and drive means adapted to connect each of the clutch inputs to the drive motor and to connect each of the clutch outputs to the rotary cam such that the first clutch may be operative to drive the rotary cam at high speed and the second clutch may be operative to drive the cam at low speed. Each of the ratchet clutches may include a toothed input member and a toothed output member. A shifting means is provided to selectively engage the toothed member of one of the ratchet clutches while simultaneously disengaging the toothed members of the other ratchet clutch.

3 Claims, 5 Drawing Figures

PATENTED MAY 23 1972 3,664,207

INVENTOR.
FREDERICK M. WHITE

BY *Walter E. [signature]*

HIS ATTORNEY

PATENTED MAY 23 1972

INVENTOR.
FREDERICK M. WHITE

BY *Walter E. Rule*

HIS ATTORNEY 3,664,207

DUAL RATCHET CLUTCH DRIVE

BACKGROUND OF THE INVENTION

This invention relates generally to a dual speed motor-driven cam-operated switch of the type which may be employed as a cycle control timer for such major appliances as domestic automatic fabric washing machines.

It is important in the design of automatic washing machines to provide appropriate cycles both for the washing of small loads of lightly soiled fabrics as well as for the washing of large loads of heavily soiled fabrics. As the capacity of the modern washer to handle large loads of fabrics has increased, it has become increasingly more difficult to utilize the same washing basket and the same washing cycle for both small and large fabric loads. It is particularly difficult to wash a small load of delicate and dainty garments in the large basket of an automatic washer without causing damage and excessive wear to such fabrics. It is also difficult to utilize, without causing excessive fabric damage, the same washing cycle or portions thereof as is used to wash large loads of heavily soiled fabrics. Furthermore, to do so would be inefficient not only with regard to the excessive quantity of water used but also with regard to the excessive length of the wash, rinse and extraction cycles to which the small load of lightly soiled fabrics would be unnecessarily subjected. To overcome the problem of washing small fabric loads in the large basket of the modern washer, it is known to provide the washing machine with a small auxiliary basket removably mounted on the agitator. Such an auxiliary basket will enable a small fabric load to be laundered in a reduced quantity of water and without being subjected to the operation of the agitator, the washing action instead being obtained by water movement resulting from the motion of the agitator-carried auxiliary basket.

Furthermore, to overcome the problem of providing an appropriate cycle for washing small loads of fabrics, it has become commonplace to provide automatic washers with such controls as will enable the operator to vary the length of the washing cycle. By the provision of such controls, the operator can select the washing cycle wherein the wash time is reduced to approximately 20 minutes, followed by the usual 4-minutes centrifugal extraction, 4-minute rinse, and the final 7-minute centrifugal extraction. However, it is important to note that while the aforementioned control may serve to provide a cycle of operation having a reduced washing time, there is no corresponding provision made for reducing the subsequent rinse and centrifugal extraction times. When the above-mentioned small auxiliary basket is used with such a cycle the usual 4-minute centrifugal extraction, 4-minute rinse, and final 7-minute centrifugal extraction are of excessive length and may cause unnecessary wear to the fabrics. It is therefore desirable that the cycle control means which is provided to control the washer operation include a capability for reducing the rinse and centrifugal extraction times as well as the washing time. It is also desirable when washing small loads of lightly soiled fabrics to reduce the wash time significantly below the common 20 minute limit usually provided.

Reference is made to application Ser. No. 887,190, filed Dec. 22, 1969 by G. N. Jennings, now U.S. Pat. No. 3,621,730, and to application Ser. No. 887,159, now abandoned, filed Dec. 22, 1969, by R.M. Fey, both of which applications disclose and claim a cycle control means adapted to perform the aforementioned desired functions. It is one object of the present invention to provide a further improved cycle control means which is simple and inexpensive in design and highly reliable in operation.

It is another object of this invention to provide such an improved cycle control means in the form of a motor-driven cam-operated switch whereby the length of each portion of the cycle may be selected from among at least two operating run times.

It is still a further object of this invention to provide such a switch having a two-speed drive train employing selectively engageable ratchet clutches adapted to selectively transmit low or high speed rotational motion from the drive motor to the rotary cam.

SUMMARY OF THE INVENTION

Briefly stated, in accordance with one aspect of the present invention, there is provided in a motor-driven cam-operated switch having at least one switch means, a rotary cam adapted to selectively open and close the switch mans in response to the rotation of the cam, and a drive motor adapted for connection to a source of electrical energy, the improvement of a two-speed drive train adapted to selectively transmit low or high speed rotational motion from the drive motor to the rotary cam. The drive train comprises a pair of ratchet clutches each having an input and an output, the input and output having associated respectively therewith a toothed input member and a toothed output member, these toothed members being adapted to transmit unidirectional motion therebetween when engaged, and being adapted to transmit no motion therebetween when disengaged. A shifting means is provided which is adapted to selectively engage the toothed members of one of the ratchet clutches while simultaneously disengaging the toothed members of the other of the ratchet clutches. Additionally, a drive means is provided which is adapted to connect each of the inputs to the drive motor and to connect each of the outputs to the rotary cam. By this arrangement, when the shifting means causes the toothed members of the first ratchet clutch to be engaged, the rotary cam will be driven at high speed, whereas, when the shifting means causes the toothed members of the second ratchet clutch to be engaged, the rotary cam will be driven at low speed.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in conjunction with the accompanying drawings, in which:

DESCRIPTION OF THE PREFERRED EMBODIMENT

Figure 1:
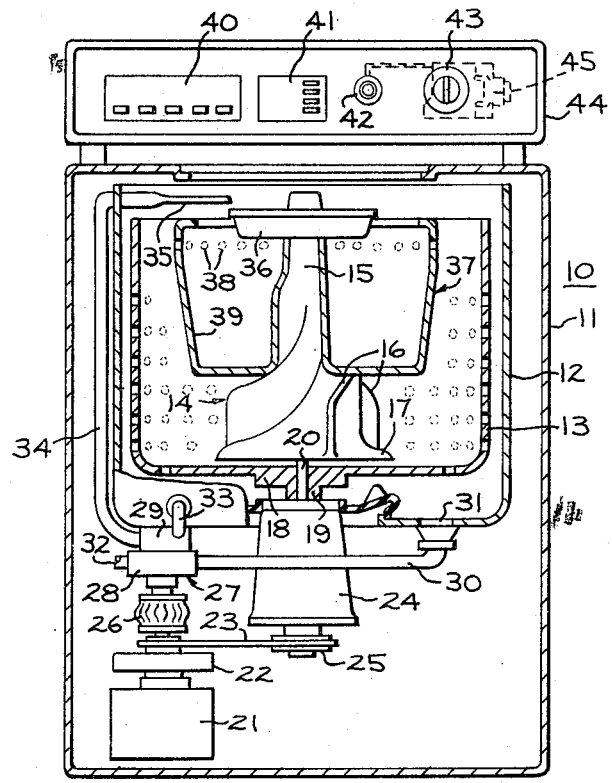
FIG. 1 is a sectional elevational view of a washing machine incorporating one embodiment of the invention.

Referring now to the drawings, and initially to FIG. 1 thereof, there is illustrated an agitator-type vertical-axis automatic clothes washer 10 having an outer supporting cabinet 11. The washer 10 may include various operational components conventionally utilized in a domestic automatic washing machine, for instance, an imperforate tub 12 rigidly mounted within the structure 11. Rotatably supported within tub 12 is a perforate washing basket 13 for washing and rinsing clothes therein and for centrifugally extracting liquid therefrom. At the center of basket 13 there is provided an agitator 14 which includes a centerpost 15 having a plurality of curved water circulating vanes 16 joined at their lower end to form an outwardly flared skirt 17.

Both washing basket 13 and agitator 14 are rotatably mounted. The basket is mounted on a flange 18 of a hub 19 and the agitator 14 is mounted on a shaft 20 which extends upwardly through the hub 19 and through the centerpost 15 and is secured to the agitator so as to drive it. During one possible cycle of operation of the washer 10, fabrics, detergent and a predetermined quantity of liquid are introduced into the tub 12 and the basket 13, and the agitator is then oscillated back and forth about its axis to wash the clothes within the basket.

After a predetermined period of this washing action, basket 13 is rotated at high speed to centrifugally extract the washing liquid from the fabrics and discharge it to a drain (not shown). Following this extraction operation, a supply of clean liquid is introduced into the basket for rinsing the fabrics and the agitator is again oscillated. Finally, the basket is once more rotated at high speed to extract the rinse liquid.

The basket 13 and agitator 14 may be driven by any suitable means. By way of example, I have shown them as driven from a reversible motor 21 through a drive mechanism including a clutch 22 mounted on the motor shaft. The motor is tailored so as to be used to its full extent when it accelerates the basket 13 to spin speed. In order to assist the motor during starting, clutch 22 allows the motor to start without a load and to then accept the load as it comes up to speed. A suitable belt 23 transmits power from the clutch 22 to a transmission assembly 24 through a pulley 25. Thus, depending upon the direction of motor rotation, the pulley 25 of transmission 24 is driven in opposite directions. The transmission 24 is so arranged that it supports and drives both the agitator drive shaft 20 and the basket mounting hub 19. When motor 21 is rotated in one direction, the transmission causes agitator 14 to oscillate and, when motor 21 is driven in the opposite direction, the transmission rotates the basket 13 and agitator 14 together at high speed for centrifugal fluid extraction. While the specific type of transmission used does not form a part of the present invention, reference is made to U. S. Pat. No. 2,844,225, issued July 22, 1958, to James R. Hubbard, et al, and assigned to the assignee of the instant invention. That patent discloses in detail the structural characteristics of a transmission assembly suitable for use in the illustrated machine.

In addition to operating the transmission 24 as described, motor 21 also provides a direct drive through a flexible coupling 26 to a pump structure 27, which includes two separate pumping units 28 and 29 which are operated simultaneously in the same direction by motor 21. Pump unit 28 has an inlet connected by a conduit 30 to an opening 31 formed in the lowermost part of tub 12 and an outlet connected by a conduit 32 to a suitable drain (not shown). Pump unit 29 has an inlet connected by a conduit 33 to the interior of tub 12 and an outlet connected by conduit 34 to a nozzle 35 which is positioned to discharge into a suitable perforate bottomed filter pan 36 which may be secured to the top portion of agitator 14 so as to be easily removable therefrom. With this structure, then, when the motor is operating so as to provide agitation, pump unit 29 draws liquid in through conduit 33 from tub 12 and discharges it through conduit 34 into filter pan 36, and then down through the small openings provided in the bottom of the filter pan back into the basket. Conversely, when the motor is reversed so as to rotate the basket 13 and agitator 14 together at high speed to centrifugally extract fluid from the fabrics, pump unit 28 will draw liquid in from opening 31 through conduit 30 and discharge it through conduit 32 to drain. Each of the pump units is substantially inoperative in the direction of rotation in which it is not used.

In order to gently wash delicate and dainty garments as well as other small loads of lightly soiled fabrics, the machine 10 may be provided with a small auxiliary basket 37 removably mounted on centerpost 15 of agitator 14 so that the washing action within this small basket is obtained by water movement resulting from the motion of the agitator 14 carrying with it the basket 37. Filter pan 36 may serve as a lid for basket 37 while the openings on the bottom of the filter pan provide an entrance for liquid into the basket 37. Liquid egress openings 38 are provided in the peripheral wall 39 of basket 37 at such height to assure the maintenance of a small volume of washing liquid in basket 37. The peripheral wall 39 may be so tapered so as to assure an upward movement of the liquid within the basket and discharge therefrom through openings 38 during centrifugal extraction.

In order to provide for the selection of various operating cycles, a variety of control means such as 40, 41, 42, and 43 may be provided within an upstanding control console 44. In accordance with one embodiment of my invention and as will be explained later in greater detail, control means 42 and 43 may be associated with a cycle control timer 45 adapted to sequentially operate the mechanism of the machine 10 through such an operating cycle as may be preselected by setting control means 40, 41, 42, and 43.

Figure 2:
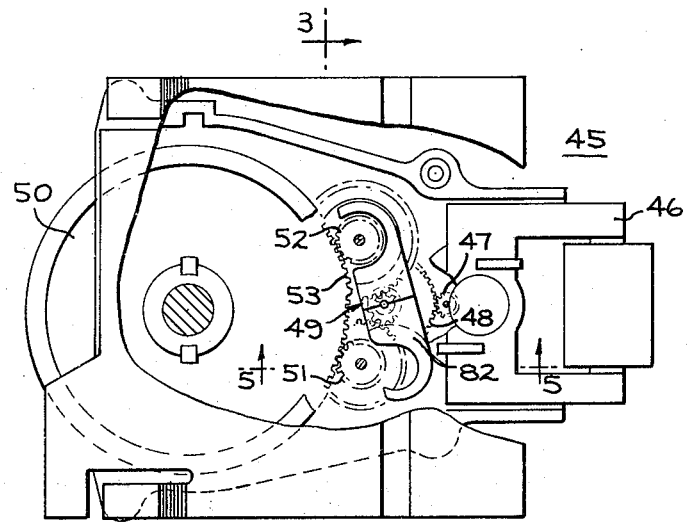
FIG. 2 is a plan view of the cam-operated switch of the present invention, the view being partly broken away to illustrate details.
Figure 4:
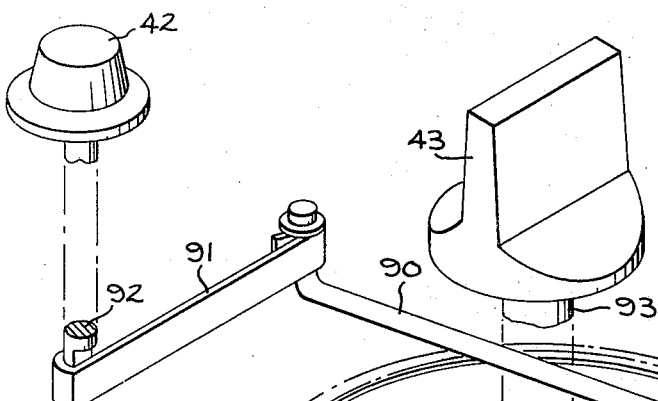
FIG. 4 is a perspective schematic view of the drive mechanism of the switch of FIG. 2.

Referring now more particularly to FIG. 2, it may be seen that cycle control timer 45 includes a drive motor 46 adapted for connection to a source of electrical energy (not shown). A drive pinion 47 extends from motor 46 and is adapted to engage a first gear 48 of a drive train indicated generally by the numeral 49. Drive train 49, as will be explained below in greater detail, is adapted to selectively transmit low or high speed rotational motion from drive motor 46 to a rotary cam 50. For his purpose drive train 49 includes a first output pinion 51 and a second output pinion 52 adapted to engage a toothed circumferental surface 53 on rotary cam 50 so as to drive the cam. Referring briefly to FIG. 4 which shows drive train 49 and cam 50 somewhat schematically, it may be seen that the lower surface of rotary cam 50 may be provided with at least one cam operating surface 54 adapted to open and close contacts 55 and 56 of at least one switch means 57. In actual practice, it will be realized that the lower surface of cam 50 may, for example, incorporate 30 or more cam operating surfaces adapted to open and close as many as 20 or more pairs of switch contacts to control washer operation.

Figure 3:
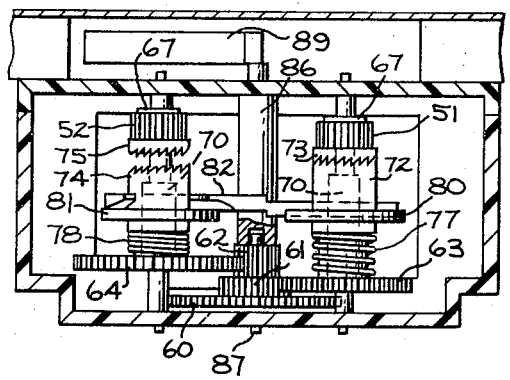
FIG. 3 is a sectional view taken along line 3—3 of FIG. 2.

In order to better explain the structural details of drive train 49, reference will be made to FIGS. 2 and 3 in conjunction with FIG. 4. It should be noted at the outset, however, that while FIG. 3 is taken from FIG. 2 looking substantially from left to right, FIG. 4 is taken looking substantially from right to left. For this reason, output gears 51 and 52 appear, respectively, on the right and left in FIG. 3 but are positioned in reverse in FIG. 4.

Referring now primarily to FIG. 4, it may be seen that drive motor pinion 47 rotating in the direction of arrow 58 serves to drive first gear 48 in the direction of arrow 59. First gear 48 comprises an integral stacked change gear having a first circumferential toothed surface 60 in engaging contact with drive pinion 47, and having second and third circumferential toothed surfaces 61 and 62 engaging, respectively, a first input gear 63 and a second input gear 64. Input gears 63 and 64 are rigidly secured, respectively, to a first clutch input shaft 65 and a second clutch input shaft 66. Output pinions 51 and 52 are rotatably mounted, respectively, on shafts 64 and 66 for rotation relative thereto and are held axially in position on their upper sides by snap rings 67.

Interposed between first input gear 63 and first output pinion 51 is a first ratchet clutch indicated generally by the numeral 68. Similarly, interposed between second input gear 64 and second output pinion 52 is a second ratchet clutch indicated generally by the numeral 69. In the preferred embodiment of the present invention, the relative gear ratios between gear 48 and each of gears 63 and 64 are such that first input shaft 65 is rotated at relatively high speed while second input shaft 66 is rotated at relatively low speed. By this arrangement, when first clutch 68 is operative to rotate first output pinion 51 at the speed of shaft 65, cam 50 will be driven at high speed; whereas, when clutch 69 is operative to drive second output gear 52 at the speed of shaft 66, cam 50 will be driven at low speed.

Turning now to the specific structure and arrangement of the elements carried by shaft 65 intermediate input gear 63 and output pinion 51, and referring for purposes of this discussion primarily to FIG. 4, it may be seen that shaft 65 has a centrally disposed region 70 of square cross section. A sleeve 71 having a square hole axially therethough is slip-fitted about region 70 such that sleeve 71 may move axially relative to shaft 65, but is constrained to rotation in conjunction with shaft 65. A toothed ratchet surface 72 is integrally formed on the upper end of sleeve 71, and as such, sleeve 71 comprises a toothed input member of the clutch 68. Integrally formed with pinion 51 and positioned atop sleeve 71 is a toothed surface 73 adapted to drivingly engage toothed surface 72. As such, output pinion 51 with integral toothed surface 73 comprises a toothed output member of the clutch 68.

It should be noted at this juncture that second ratchet clutch 69, in the preferred embodiment of the invention, comprises an identical structure to first ratchet clutch 68, and includes a toothed input member 74 and a toothed output member 75, input member 74 being axially movable along a region of square cross section on shaft 66.

In order for clutches 68 and 69 to selectively transmit low or high speed rotational motion from drive motor 46 to rotary cam 50, some means must be provided to selectively engage either clutch 68 or clutch 69. A shifting means, generally designated by the numeral 76, is accordingly provided to selectively engage either the toothed members of clutch 68 or clutch 69. Shifting means 76 comprises a series of interacting components including a first biasing means 77 associated with first clutch 68, a second biasing means 78 associated with second clutch 69, and a cam means 79 which may selectively associate with either clutch 68 or 69, as will be explained below.

Taking these elements of shifting means 76 in order, it will be seen that biasing means 77 comprises a compression coil spring operative between the upper surface of gear 63 and the lower surface of sleeve 71 to force sleeve 71 upwardly thereby serving to normally maintain engagement between toothed surfaces 72 and 73. In a similar fashion, biasing means 78 comprises a compression coil spring operative to normally maintain engagement between toothed input member 74 and toothed output member 75.

Figure 5:
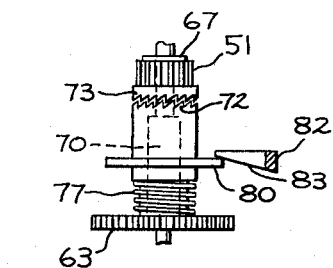
FIG. 5 is a partial sectional view taken along line 5—5 of FIG. 2.

Cam means 79 comprises two pairs of cooperating camming surfaces and is adapted to selectively overcome the operation of either of the aforementioned biasing means 77 or 78, whereby the other biasing means is operative to engage its associated toothed members for the transmission of motion therebetween. More specifically, cam means 79 includes a first radially extending surface 80 formed on the lower portion of input sleeve 71, and a second radially extending surface 81 formed on the lower portion of toothed input member 74. Pivotally mounted about an axis parallel to shafts 65 and 66 and disposed intermediate surfaces 80 and 81 is a double-acting cam comprising an arm 82 having a first cam surface 83 formed adjacent one end thereof for engagement with first radially extending surface 80, and a second cam surface 84 formed adjacent the other end of the arm 82 for engagement with the second radially extending surface 81. Cam surfaces 83 and 84 comprise downwardly sloping ramp structures such that when surface 83 or 84 engages its associated surface 80 or 81, such associated surface is caused to move axially downwardly. The camming action of surface 83 is most clearly seen in FIG. 5 wherein the cam surface has started to engage surface 80 and to move sleeve 71 downwardly. It will be understood that cam surface 84 operates in the same fashion as cam surface 83. By this arrangement, when arm 82 is pivoted in the direction of arrow 85, first cam surface 83 is caused to engage the first radially extending surface 80 causing sleeve 71 to move axially downwardly along region 70 of shaft 65 thereby disengaging toothed surfaces 72 and 73. Concurrently, as arm 82 rotates in the direction of arrow 85, second cam surface 84 is withdrawn from engagement with the second radially extending surface 81 whereby spring 78 is operative to move toothed input member 74 into engagement with toothed output member 75 thereby engaging the second ratchet clutch 69. Conversely, when arm 82 is rotated in the direction opposite arrow 85, first cam surface 83 is withdrawn from engagement from first radially extending surface 80 and second cam surface 84 is returned to engagement with second radially extending surface 81 thereby enabling spring 77 to re-engage first ratchet clutch 68 while second ratchet clutch 69 is caused to be disengaged.

Referring now to FIG. 3, in conjunction with FIG. 4, it may be seen that arm 82 is carried by a control shaft 86 which is hollow at its lower end permitting it to be supported for rotation from a stub shaft 87 on which first gear 48 is mounted. Although shaft 86 and 87 are concentrically supported, they are free to rotate relative to each other thereby permitting the rotation of arm 82 independent of the rotation of first gear 48. As may best be seen in FIG. 4, control shaft 86 extends upwardly and terminates with a flat formation 88 adapted to receive and support a first arm 89 for rotation therewith. Arm 89 connects with a linkage rod 90 which, in turn, connects with a second arm 91. Second arm 91 is, in turn, connected to and supported by a shaft 92 extending rearwardly from control means 42. By this arrangement, selective positioning of control means 42 may serve to rotate shaft 86 so as to selectively engage either clutch 68 or 69.

It will be recognized that one important function of clutches 68 and 69 is to permit the operator to rotate control means 43, which as seen in FIG. 4 may be connected to cam 50 by shaft 93, to an initial starting position without causing a corresponding rotation of the drive motor 46. In other words, when the operator desires to rotate control means 43 in the direction of arrow 94, toothed surface 53 will cause output gears 51 and 52 to rotate so as to overdrive clutches 68 and 69 consequently transmitting no rotational motion to shafts 65 or 66 or to drive motor 46. This is to say, when output pinions 51 and 52 are rotated, respectively, in the direction of arrows 95 and 96, whichever of the toothed output members of clutches 68 and 69 is then in engagement with its associated toothed input member, will be caused to ride downwardly thereby momentarily disengaging such toothed input and toothed output members, and substantially no rotational torque will be transmitted therebetween.

It will also be recognized that the present invention also provides a substantial improvement over the devices of the aforementioned Jennings and Fey applications in that in order for an operator to rotate control means 43 in the direction of arrow 94, he need only overcome the action of one of the biasing means. This is to say that the operator experiences a minimal amount of resistance in attempting to advance the control means 43, whereas with the devices of the Jennings and Fey applications, a large amount of force is required to overcome the operation of an interference wound coil spring.

In operation, when it is desired to launder a small load of lightly soiled fabrics, auxiliary basket 37 may be installed on agitator 14 and the fabrics to be washed placed within basket 37. Filter pan 36 may then be installed as a cover for the auxiliary basket 37 and detergent placed therein for the washing process. Control means 40, 41, 42 and 43 may then be positioned so as to provide the desired washing action. In particular, control means 42 may be rotated so as to cause clutch 68 to be engaged and clutch 69 to be disengaged such that clutch 68 is operative to drive the cam 50 at high speed. Control 43 may then be positioned so as to start the laundering cycle at a position on cam surface 50 which will result in a wash time of the desired length. Machine operation then proceeds through the washing cycle with the cam-operated switch 50 being driven at high speed so as to substantially shorten the centrifugal extraction and rinse operation which follow the washing operation.

When, in the alternative, it is desired to wash a large load of fabrics in the basket 13, auxiliary basket 37 is removed from the machine. The fabrics are placed within basket 13, and such detergent as may be required is placed within filter pan 36. Controls 40, 41, 42 and 43 are then set to carry out the desired washing cycle. In particular, control 42 is positioned so as to engage clutch 69 and to disengage clutch 68 thereby enabling clutch 69 to transmit low speed rotational motion to cam 50. Control means 43 is then positioned to select a desired laundering time, whereafter, cam-operated switch 45 will run at low speed resulting in centrifugal extraction and rinse operations of normal length.

As was previously mentioned, the cam-operated switch of this invention is particularly adapted for use in connection with automatic clothes washers, wherein it is desirable to provide for the washing of small loads of lightly soiled fabrics with a washing cycle having reduced centrifugal extraction and rinse times as well as a reduced washing time. From the foregoing description, it should now be apparent that the present invention, by employing a cam-operated switch having a two-speed drive train with dual ratchet clutches adapted to selectively transmit low or high speed rotational motion from the drive motor to the rotary cam, provides such a control means which may serve to reduce centrifugal extraction and rinse times as well as the washing time.

As will be evident from the foregoing description, certain aspects of the invention are not limited to the particular details of construction of the example illustrated, and it is contemplated that various modifications or alternate applications will occur to those skilled in the art. It is therefore intended that the appended claims shall cover such modifications and applications as do not depart from the true spirit and scope of the invention.

What is claimed as new and desired to be secured by Letters Patent of the United States is:

1. In a motor-driven cam-operated switch having at least one switch means, a rotary cam adapted to selectively open and close the switch means in response to the rotation of the cam, and a drive motor adapted for connection to a source of electrical energy, the improvement of a two-speed drive train adapted to selectively transmit low or high speed rotational motion from the drive motor to the rotary cam, comprising:
   a first ratchet clutch having an input and an output, said input and said output having associated respectively therewith a toothed input member and a toothed output member, said toothed members being adapted to transmit unidirectional motion therebetween when engaged, and adapted to transmit no motion therebetween when disengaged;
   a second ratchet clutch having an input and an output, said input and said output having associated respectively therewith a toothed input member and a toothed output member, said toothed members being adapted to transmit unidirectional motion therebetween when engaged, and adapted to transmit no motion therebetween when disengaged;
   shifting means adapted to selectively engage the toothed members of one of said ratchet clutches while simultaneously disengaging the toothed members of the other of said ratchet clutches; and
   drive means adapted to connect each of said inputs to the drive motor and to connect each of said outputs to the rotary cam such that said first ratchet clutch may be operative to drive the rotary cam at high speed and the second ratchet clutch may be operative to drive the cam at low speed;
   whereby when said shifting means causes the toothed members of said first ratchet clutch to be engaged, the rotary cam will be driven at high speed, whereas, when said shifting means causes the toothed members of said second ratchet clutch to be engaged, the rotary cam will be driven at low speed;
   said shifting means comprising:
   a first biasing means associated with said first ratchet clutch and adapted to bias said toothed members thereof into engagement;
   a second biasing means associated with said second ratchet clutch and adapted to bias said toothed members thereof into engagement; and
   cam means associated with one of the toothed members of each of said ratchet clutches to selectively overcome the operation of one of said biasing means whereby the other of said biasing means is operative to engage its associated toothed members for the transmission of motion therebetween.

2. The invention of claim 1 wherein said cam means comprises:
   a first radially extending surface formed on one of said toothed members of said first ratchet clutch;
   a second radially extending surface formed on one of said toothed members of said second ratchet clutch;
   a movable cam adapted to selectively engage and move one of said radially extending surfaces thereby selectively disengaging the toothed members of one of said ratchet clutches.

3. The invention of claim 2 wherein said movable cam comprises:
   an arm having a first cam surface formed adjacent one end thereof for engagement with said first radially extending surface, and a second cam surface formed adjacent the other end thereof for engagement with said second radially extending surface;
   said arm being pivotally mounted about a point intermediate the positions of said first and second radially extending surfaces;
   whereby, when said arm is pivoted in one direction said first cam surface is caused to engage said first radially extending surface and said second cam surface is caused to disengage said second radially extending surface of said first ratchet clutch and enabling the engagement of said second ratchet clutch, whereas, when said arm is pivoted in the opposite direction said second cam surface is caused to engage said second radially extending surface and said first cam surface is caused to disengage said first radially extending surface thereby disengaging second ratchet clutch and enabling the engagement of said first ratchet clutch.

* * * * *